Sept. 20, 1971          P. G. BORDNER          3,605,356
PREFABRICATED PLASTIC WINDOW SILL
Filed April 6, 1970
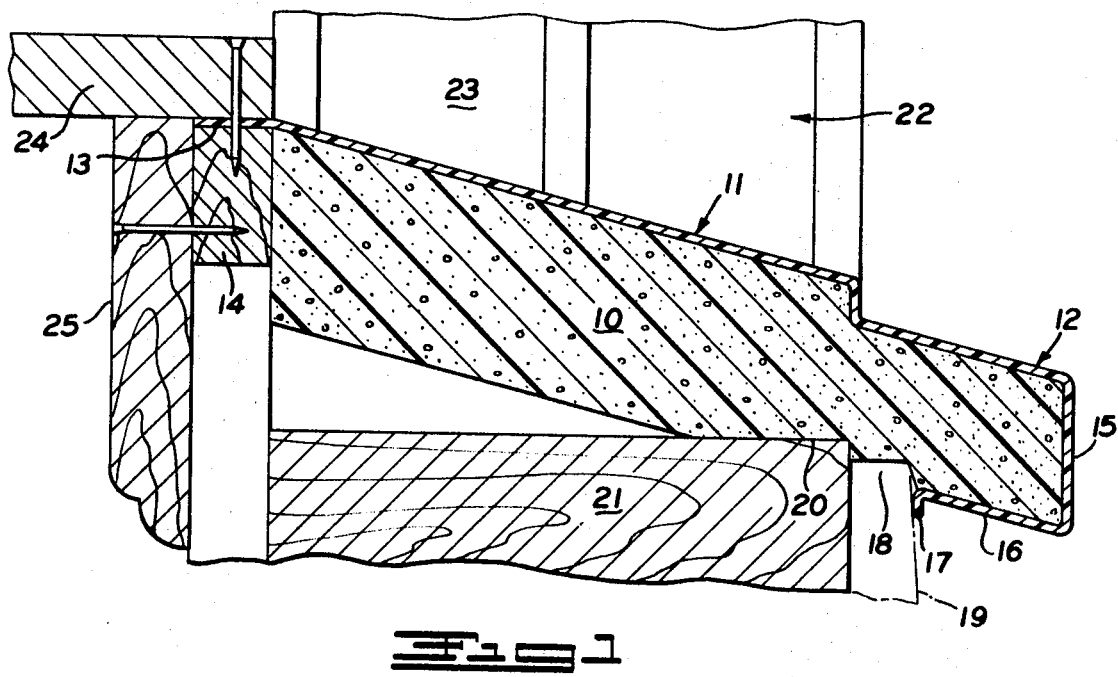
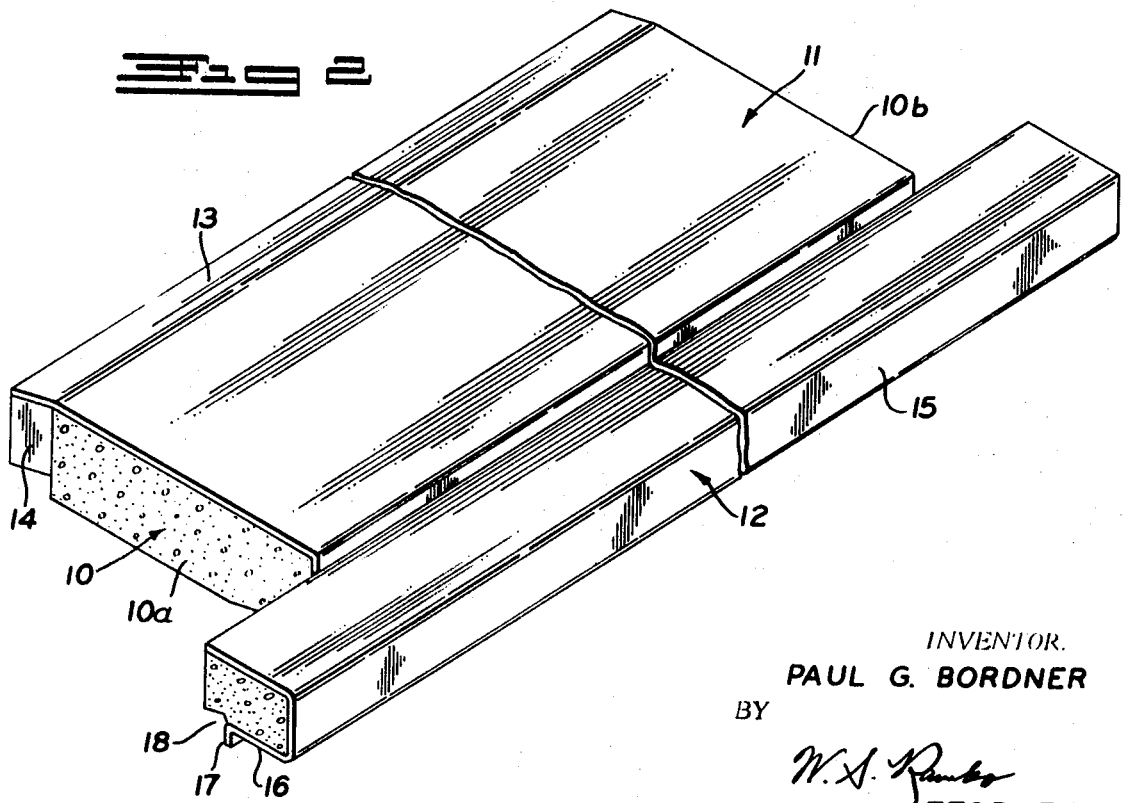
INVENTOR.
PAUL G. BORDNER
BY
ATTORNEY

United States Patent Office

3,605,356
Patented Sept. 20, 1971

---

3,605,356
PREFABRICATED PLASTIC WINDOW SILL
Paul G. Bordner, Columbus, Ohio, assignor to Crane Plastics, Inc., Columbus, Ohio
Filed Apr. 6, 1970, Ser. No. 25,900
Int. Cl. E04d *13/00, 15/08*
U.S. Cl. 52—97                                          4 Claims

ABSTRACT OF THE DISCLOSURE

A prefabricated window sill of plural density, synthetic resin composition having a main body portion or core formed from a lightweight, expanded, cellular plastic material and a relatively thin, exterior skin or clad composed of a denser, rigid, weather-resistant plastic material. The window sill is sized and finished for installation in standard sizes of window openings without requiring cutting or other shaping thereof.

BACKGROUND OF THE INVENTION

This invention relates generally to building components and more specifically to window sills.

In the past, window sills have generally been formed from wood, stone, brick, or in certain instances from sheet metal. Usually, such window sills are constructed and installed on the building site to fit a particular window opening. These so-called custom-built window sills are relatively expensive and represent a sizeable proportion of the overall cost of window construction.

SUMMARY AND OBJECTS OF THE INVENTION

The present invention provides a pre-cut and pre-finished window sill of composite plastic composition, wherein the main body portion of the sill is composed of a relatively lightweight, expanded, cellular plastic material, and the outer, exposed surfaces of the sill are composed of a relatively dense, rigid and weather-resistant plastic material.

The primary object of this invention is to provide a comparatively inexpensive, yet durable prefabricated window sill of predominantly synthetic resin composition which may be rapidly and easily installed in a window frame without cutting, or shaping, and without requiring painting or finishing thereof.

BRIEF DESCRIPTION OF THE DRAWING

In the accompanying drawing:

FIG. 1 is a transverse vertical sectional view of a prefabricated, plastic window sill according to the present invention and showing the manner in which it is installed in a conventional, double-hung window frame; and FIG. 2 is a perspective view of the window sill apart from the window frame.

DESCRIPTION OF PREFERRED EMBODIMENT

With reference to the drawing, it will be seen that the present window sill consists of a unitary, generally rectangular, structure which comprises a main body portion or core 10 preferably composed of an integral, rigid body of an expanded or foamed polyurethane or isocyanate resin, and a comparatively thin, outer layer, clad, or skin 11 composed of a relatively denser, rigid and wear-resistant plastic or synthetic resin, such as polyvinyl chloride. The sill structure is formed along its front or outer longitudinal edge with a downwardly stepped, relatively elongated overhang lip 12. Along its opposite or inner longitudinal edge, the surface layer or skin 11 is extended transversely beyond the core or body portion 10 to form a relatively thin, horizontal, anchoring strip 13. Adhesively secured in depending, subjacent relation to the anchoring strip 13 and in abutting relation to the inner edge of the core 10 is a longitudinally coextensive, rectangular wood nailing strip 14.

Preferably, the outer skin or layer 11 of the sill structure is formed as an integral, one-piece extrusion having the angular, channel-shaped cross-section shown particularly in FIG. 1. The lightweight core 10 of expanded resin may be separately formed either by extrusion, or molding, or it may be foamed-in-place against the undersurface of the outer skin 11 with the aid of a properly shaped and conventional mold plate or structure. Also, it is possible to simultaneously form both the outer skin 11 and the inner core 10 as a dual extrusion. It is also possible to preform the core 10 and thereafter apply the outer skin 11 thereto as an initially liquid coating which is subsequently hardened by heat curing. Thus, regardless of the particular method or technique employed in fabricating the core 10 and the exterior layer or skin 11, they are ultimately joined together to form a unitary, if not integral, structure. So, also the wood nailing strip 14 is preferably adhesively or otherwise securely joined to the core 10 and anchoring strip 13 to provide an overall unitary assemblage.

As will be noted particularly from FIG. 1, the outer skin 11 is formed so as to extend around the outer longitudinal edge 15 and the underside 16 of the overhang lip portion 12 of the sill, and terminates in a free, downturned lip or flange 17. The core 10 of the sill is formed adjacent to the flange 17 with a longitudinally coextensive notch or recess 18 which is arranged to receive and provide space for the upper edge portion of an outer siding panel or strip indicated by broken lines at 19. The underside of the core 10 is also notched or recessed longitudinally at 20, so as to fit and conform to the upper, outer corner portion of a horizontally disposed sill-supporting plate 21 which forms a conventional, structural part of the building wall in which the sill is positioned.

As previously indicated, the present, prefabricated window sills are made in varying lengths, so as to fit within various standard sizes of window openings. Upon assembly or installation of the window sill, it is placed in the window opening 22 of the building wall between the vertical side frames 23 of the window frame with the notch or recess 20 fitted against the upper and outer corner of the frame plate 21 of the building wall. Thus located, the sill assumes a downwardly and outwardly inclined position at the bottom of the window opening, with the overhang lip portion 12 extending slightly outwardly from the window opening and laterally beyond the vertical side frames 23 of the window opening. Nails or other fasteners, not shown, may then be driven or passed generally horizontally through the vertical side frames 23 of the window opening and into the opposite end portions 10a and 10b of the core of the sill to securely fasten the sill in the position shown in FIG. 1 of the drawing. Also, the wood nailing strip 14 may be anchored to the adjacent frame member of the window opening by nails or screws, not shown. After fastening the sill in the position shown in FIG. 1, an interior window ledge plate 24 may be nailed or otherwise secured to the anchoring flange 13 and nailing strip 14 of the sill. So, also, an interior molding or finishing strip 25 may be nailed or otherwise secured in conventional location to the nailing strip 14 to thus finish and trim the interior of the window opening beneath the ledge 24.

In view of the foregoing, it will be seen that the present invention provides improved, prefabricated plastic window sills of standardized dimensions adapted to fit correspondingly standardized sizes of window openings. The window sills of this invention are characterized by their economy of manufacture, ease of installation and durability.

I claim:

1. A prefabricated window sill comprising a unitary, generally rectangular structure arranged to fit between the vertical sides of a rectangular window frame and having a body portion composed of a relatively lightweight, expanded synthetic resin and a relatively thinner, exterior surface skin composed of a comparatively denser, rigid and non-porous synthetic resin, said structure being formed along one of its longitudinal edges with a relatively elongated outer lip portion arranged to extend laterally beyond each side of a window opening in which said structure is fitted.

2. A window sill as defined in claim 1, wherein the exterior surface skin of said structure is extended beyond the body portion along the longitudinal edge of the structure opposite said outer lip portion to form a relatively thin anchoring strip for said structure.

3. A window sill as defined in claim 2, including a wood nailing strip secured in longitudinally coextensive, subjacent relationship to said anchoring strip.

4. A window sill as defined in claim 1, wherein the body portion of said structure is composed of a rigid, polyurethane foam and the exterior surface skin is composed of a rigid, vinyl polymer.

References Cited

UNITED STATES PATENTS

| 1,099,499 | 6/1914 | Hackett | 52—97 |
| 1,794,809 | 3/1931 | Van Alen | 52—97X |
| 2,733,787 | 2/1956 | Morra | 52—97 |
| 2,753,603 | 7/1956 | Strawther | 52—97 |

JORDAN FRANKLIN, Primary Examiner

G. V. LARKIN, Assistant Examiner

U.S. Cl. X.R.

52—11, 58